US007281749B2

(12) United States Patent
Yamada et al.

(10) Patent No.: US 7,281,749 B2
(45) Date of Patent: Oct. 16, 2007

(54) SEAT DEVICE FOR VEHICLE

(75) Inventors: Yukifumi Yamada, Toyota (JP); Sadao Ito, Anjo (JP); Hideo Nihonmatsu, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 247 days.

(21) Appl. No.: 10/984,858

(22) Filed: Nov. 10, 2004

(65) Prior Publication Data

US 2005/0104404 A1 May 19, 2005

(30) Foreign Application Priority Data

Nov. 14, 2003 (JP) ............................. 2003-385504

(51) Int. Cl.
*B60N 2/42* (2006.01)
(52) U.S. Cl. ............................ 296/65.05; 296/65.09; 296/65.08; 296/65.18; 297/314; 297/315; 297/330
(58) Field of Classification Search ............ 296/65.05, 296/65.08, 65.09, 65.18; 16/224, 280, 284; 297/314–315, 330, 344.16, 344.17; 248/421
See application file for complete search history.

(56) References Cited

U.S. PATENT DOCUMENTS 6,068,280 A * 5/2000 Torres

FOREIGN PATENT DOCUMENTS

JP 8-58453 3/1996

* cited by examiner

*Primary Examiner*—Stephen Gordon
(74) *Attorney, Agent, or Firm*—Buchanan Ingersoll & Rooney PC

(57) ABSTRACT

A vehicle seat device includes a right side link mechanism and a left side link mechanism adapted to be provided between a vehicle floor and a seat for supporting the seat to move upward and downward relative to the vehicle floor, a first actuator operatively engaged with the right side link mechanism for operating the right side link mechanism, a second actuator operatively engaged with the left side link mechanism for operating the left side link mechanism, and a controller for controlling the first actuator and the second actuator separately.

9 Claims, 8 Drawing Sheets

SEAT DEVICE FOR VEHICLE

CROSS REFERENCE TO RELATED APPLICATIONS

This application is based on and claims priority under 35 U.S.C. §119 with respect to Japanese Patent Application No. 2003-385504 filed on Nov. 14, 2003, the entire content of which is incorporated herein by reference.

FIELD OF THE INVENTION

The present invention relates to a seat device for vehicle. More particularly, the present invention pertains to a seat device for vehicle for controlling a seat to incline in accordance with the centrifugal force applied to the vehicle in the lateral direction in order to improve in holding occupants by the seat at cornering operation of the vehicle.

BACKGROUND

A known seat device, for example described in JPH08 (1997)-058453, includes a rolling mechanism for inclining the seat in accordance with the centrifugal force in the lateral direction applied to the vehicle. With the construction described in JPH08 (1997)-058453, the rolling mechanism is positioned under a seat cushion, such that the seat rotates relative to a rotational center in approximately central back and forth direction of the seat. Accordingly, for example, in case the right side of the seat is moved downward, the left side of the seat is moved upward to incline the seat.

In case the seat device includes the rolling mechanism and a height adjusting function for adjusting the height of the seat relative to a vehicle floor depending on a driving posture of the occupant, it is required to position the height adjusting device either over or under the rolling mechanism. However, it is difficult to provide plural mechanisms under the seat relative to the vehicle floor due to the limitation of the space.

A need thus exists for a seat device for vehicle including a rolling function and a height adjusting function for a seat, which are positioned between the seat and a vehicle floor.

SUMMARY OF THE INVENTION

In light of the foregoing, the present invention provides a vehicle seat device, which includes a right side link mechanism and a left side link mechanism adapted to be provided between a vehicle floor and a seat for supporting the seat to move upward and downward relative to the vehicle floor, a first actuator operatively engaged with the right side link mechanism for operating the right side link mechanism, a second actuator operatively engaged with the left side link mechanism for operating the left side link mechanism, and a controller for controlling the first actuator and the second actuator separately.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
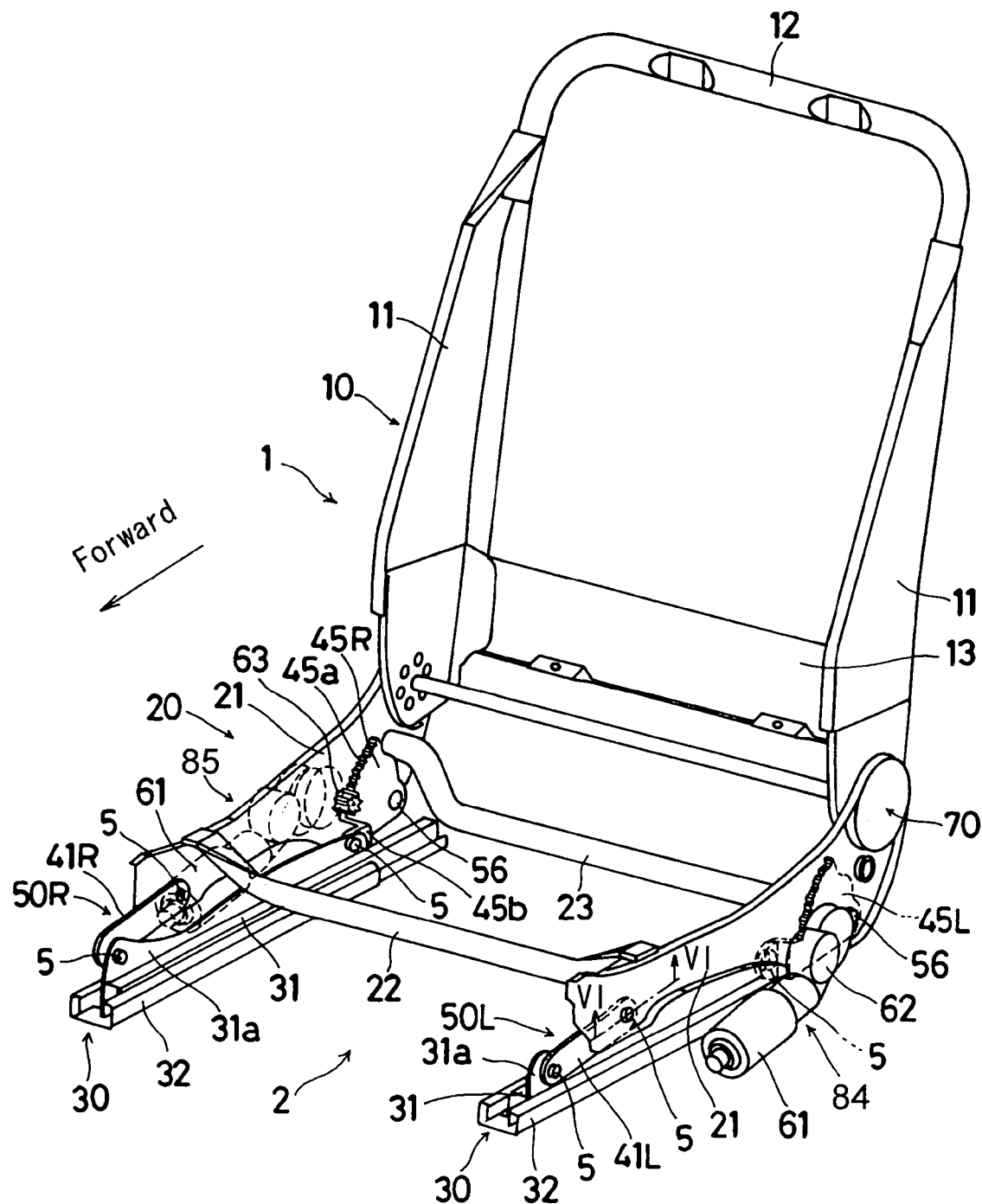
FIG. 1 shows a perspective view of a seat including a seat device for vehicle according to an embodiment of the present invention.

Embodiments of the present invention will be explained with reference to the illustrations of the drawing figures as follows.

As shown in FIG. 1, a seat 1 including a rolling seat device 2 includes a seatback frame 10 for a seatback serving as a backrest portion for an occupant, and a cushion frame 20 for a seat cushion serving as a seating portion. The seatback frame 10 includes side frames 11, 11 extended upward and downward at right and left sides of the seat 1, an upper frame 12 for connecting the side frames 11, 11 at top ends thereof, and a connection bracket 13 for connecting the side frames 11, 11 at bottom ends thereof. The rigidity and the strength of the seatback frame 10 is ensured by the upper frame 12 and the connection bracket 13. The cushion frame 20 includes cushion side frames 21, 21 (i.e., serving as a seat side frame member) extended in the back and forth direction of the vehicle and positioned at right and left sides of the seat 1. The cushion side frames 21, 21 are connected by a connection pipe 22 and a connection pipe 23 arranged separately keeping a predetermined distance from each other to ensure the rigidity and the strength. The seat 1 further includes a seat reclining device 70 for adjusting reclining angle of the seatback frame 10 relative to the cushion frame 20. The seat reclining device 70 includes a lock mechanism having the locking strength required for the seat 1. Thus, the cushion frame 20 and the seatback frame 10 include the sufficient rigidity and the strength to be boarded on the vehicle.

A seat slide device 30 is provided under each cushion frame 21. The seat slide device 30 includes a lower rail 32 fixed to a floor 9 (shown in FIG. 2) and an upper rail 31 slidably guided in the back and forth direction by the lower rail 32. The position of the upper rail 31 relative to the lower rail 32 in the back and forth direction is adjusted by the effect of the lock mechanism.

The upper rail 31 includes a longitudinal wall portion 31a (i.e., serving as a floor side frame member) unitarily formed with the upper rail 31 to be extended upward. The rolling seat device 2 includes a right side link mechanism 50R and a left side link mechanism 50L for connecting the respective cushion side frame 21 and the longitudinal wall portion 31a.

The right side link mechanism 50R and the left side link mechanism 50L are arranged to be line symmetric relative to an imaginary centerline of the seat 1. Each right side link mechanism 50R and left side link mechanism 50L includes a front link 41R, 41L serving as a front link member at front side of the cushion frame 20. First ends of the front link 41R, 41L are connected to the respective longitudinal wall portion 31a and second ends of the front link 41R, 41L are rotatably connected to the cushion side frame 21 via a rolling shaft mechanism 5. The link mechanism 50R, 50L further includes link gear 45R, 45L (i.e., serving as a rear link member) positioned rear side of the cushion frame 20 respectively. The plate configured link gears 45R, 45L are formed with a partial gear 45a at end surface thereof and are attached to the cushion side frame 21 to be rotatable about a rotational shaft 56 at a center of the partial gear 45a. An arm portion 45b projected in the radial direction of the partial gear 45a is formed at the link gear 45R, 45L. A tip end of the arm portion 45b is connected to the longitudinal wall portion 31a with the rolling shaft mechanism 5 likewise the front link 41R, 41L.

Cushion side frames 21, 21 are provided with actuators 84, 85 (i.e., serving as a second actuator and a first actuator) respectively for independently operating the left side link mechanism 50L and the right side link mechanism 50R. Each actuator 84, 85 includes an electric motor 61, a deceleration mechanism 62 for decelerating the rotational speed of the electric motor 61, and a pinion gear 63 geared to transmit the rotation to the partial gear 45a of the link gear 45R, 45L. The link gears 45R, 45L are rotated by the operation of the electric motors 61, 61.

The shaft centers of the rolling shaft mechanisms 5, 5 supporting both ends of the front link 41R, 41L, and the shaft centers of the rolling shaft mechanism 5 and the rotational shaft 56 supporting the arm portion 45b of the link gear 45R, 45L (i.e., serving as the rear link) are arranged to serve as the vertices of a parallelogram. In other words, each right side link mechanism 50R and left side link mechanism 50L include a parallel link mechanism (serving as a parallel link) configured to maintain the position by the actuator 84, 85 independently. The upper rail 31 is held at a predetermined position relative to the cushion side frame 21 with the rigidity and the strength.

Figure 6:
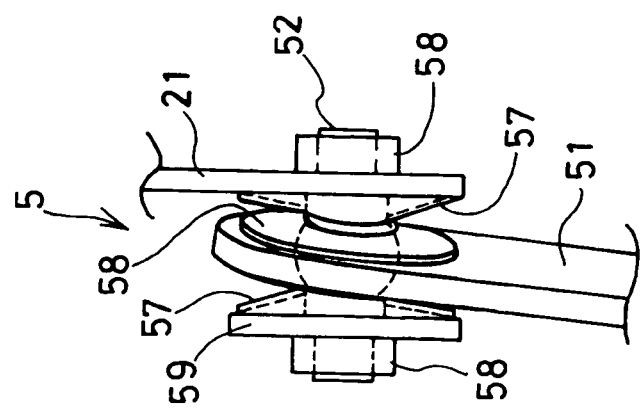
FIG. 6 is a cross-sectional view of a rolling shaft mechanism taken on line VI-VI of FIG. 1.
Figure 7:
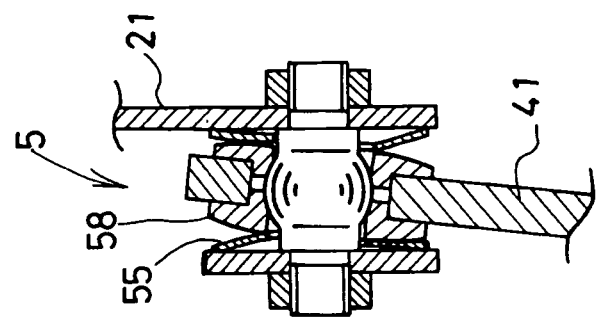
FIG. 7 is a cross-sectional view of the rolling shaft mechanism taken on line VI-VI of FIG. 1, showing a state that a front link tilts relative to a cushion side frame.
Figure 8:
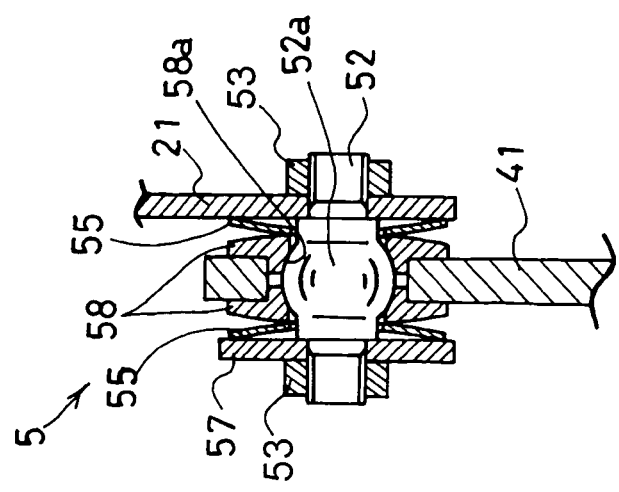
FIG. 8 is a plane view corresponding to FIG. 7 showing the state that the front link tilts relative to the cushion side frame.

As shown in FIG. 6, the rolling shaft mechanism 5 includes a rotational shaft 52 whose first end is fixed to the cushion side frame 21 with a nut 53, a pair of plates 58, 58 having a ball shape hole 58a being penetrated with the rotational shaft 52 and fixed by sandwiching the front link 41, a washer 57 fixed to a second end of the rotational shaft 52 with the nut 53, and a conical spring 55 (i.e., serving as an elastic member) configured to be compressed and provided between the washer 57 and one of the plates 58. A ball shape shaft portion 52a is formed at the central portion of the rotational shaft 52. The ball shape hole 58a of the plate 58 includes a spherical inner surface closely contacting the ball shape shaft portion 52a to achieve the slidable rotation therebetween. By the engagement between the ball shape hole 58a of the plate 58 and the ball shape shaft portion 52a, as shown in FIGS. 7-8, the rotational shaft of the front link 41R, 41L is configured to have a predetermined tilt relative to the central shaft of the rotational shaft 52. In other words, the front link 41R, 41L tilts relative to the cushion side frame 21.

As shown in FIGS. 6-7, the conical spring 55 is compressed by the tilting of the front link 41R, 41L relative to the cushion side frame 21. That is, the rotational center shaft of the front link 41R, 41L is configured to always receive the restoring force from the conical spring 55 to return in the direction corresponding to the central shaft of the rotational shaft 52. The restoring force affects the front link 41R, 41L to return with larger force as the tilt of the front link 41R, 41L increases. In case of the state that the rotation center shaft of the front link 41R, 41L and the center shaft of the rotational shaft 52 correspond each other, as shown in FIG. 6, the conical spring 55 receives a predetermined compression at the attached state to affect a predetermined friction force to the front link 41R, 41L, which rotates with relatively light load. With the construction of the rolling shaft mechanism 5, either one of the rotational shaft 52 or the plate 58 may be fixed to any one of the front link 41R, 41L, the cushion side frame 21, or the link gear 45R, 45L.

Figure 11:
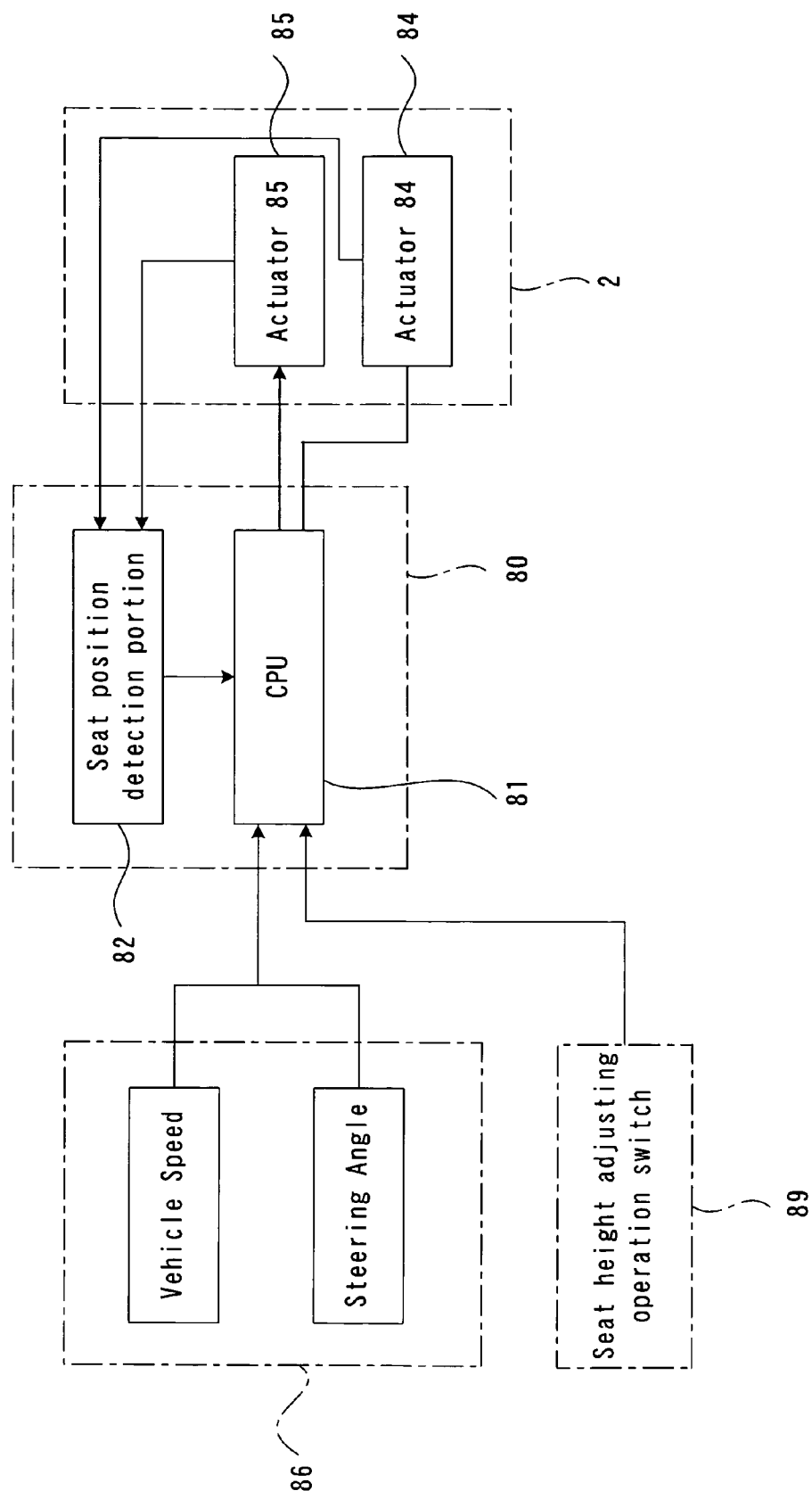
FIG. 11 is a block view showing a control system of the seat device for vehicle according to the embodiments of the present invention.

Further, as shown in FIG. 11, a controller 80 (i.e., serving as a controller) including a CPU 81 is connected to the rolling seat device 2 in order to operate the actuator 84, 85 for the left side link mechanism 50L and the right side link mechanism 50R. The CPU 81 actuates the actuators 84, 85 of the rolling seat device 2 in accordance with an output from a vehicle state detection portion 86 (i.e., serving as a detection means) based on vehicle speed and steering angle, and an output from a seat height adjusting operation switch 89. The height and the inclination of the seat 1 adjusted by the operation of the actuator 84, 85 is detected by a positional sensor provided at the actuator 84, 85. The position of the seat 1 is judged at a seat position detection portion 82 based on the data from the positional sensor and fed back to the CPU 81 to accurately position the seat 1.

The operation of the rolling seat device 2 will be explained as follows.

Figure 2:
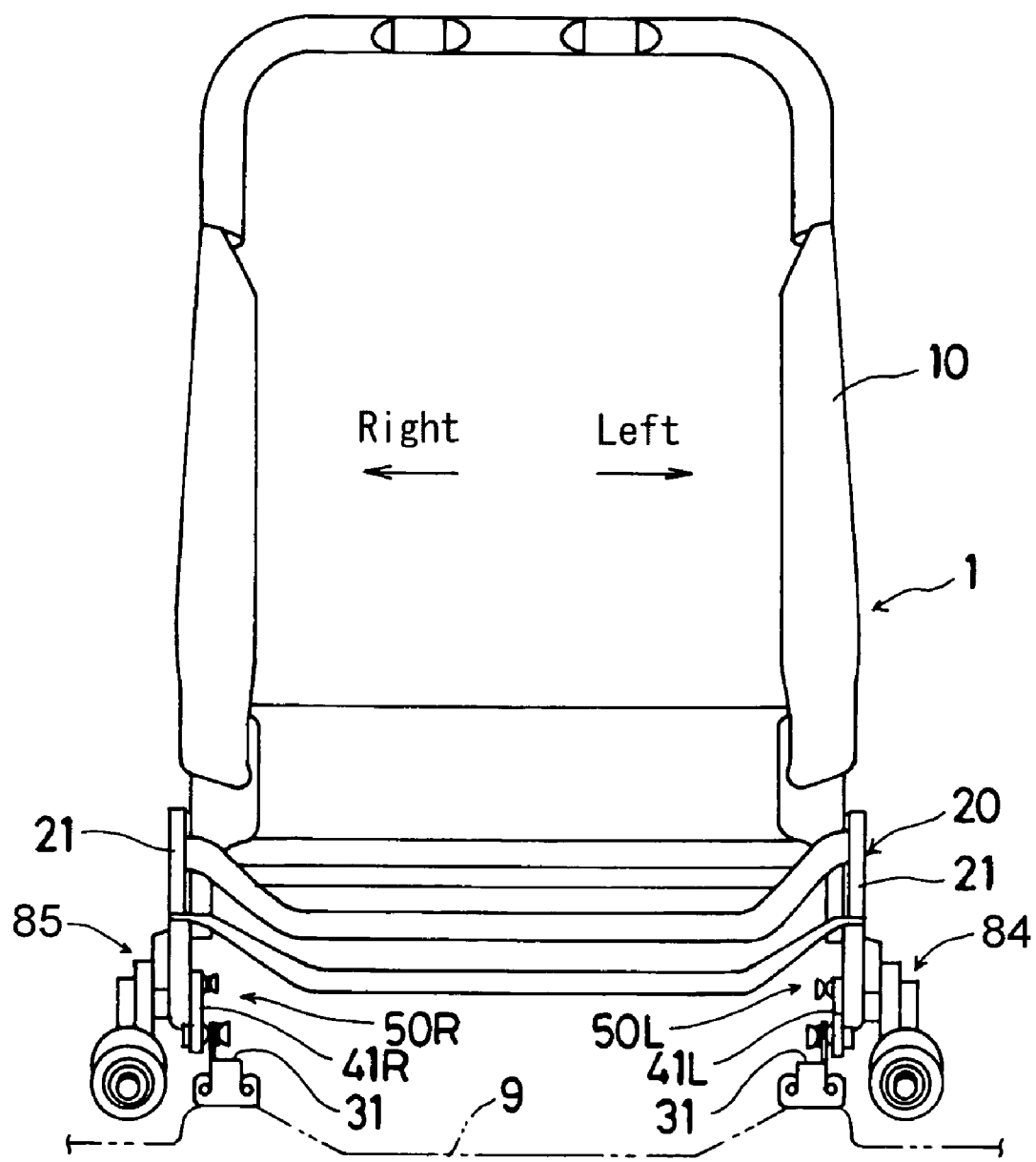
FIG. 2 shows a front view of the seat device for vehicle at a normal state according to the embodiment of the present invention.
Figure 3:
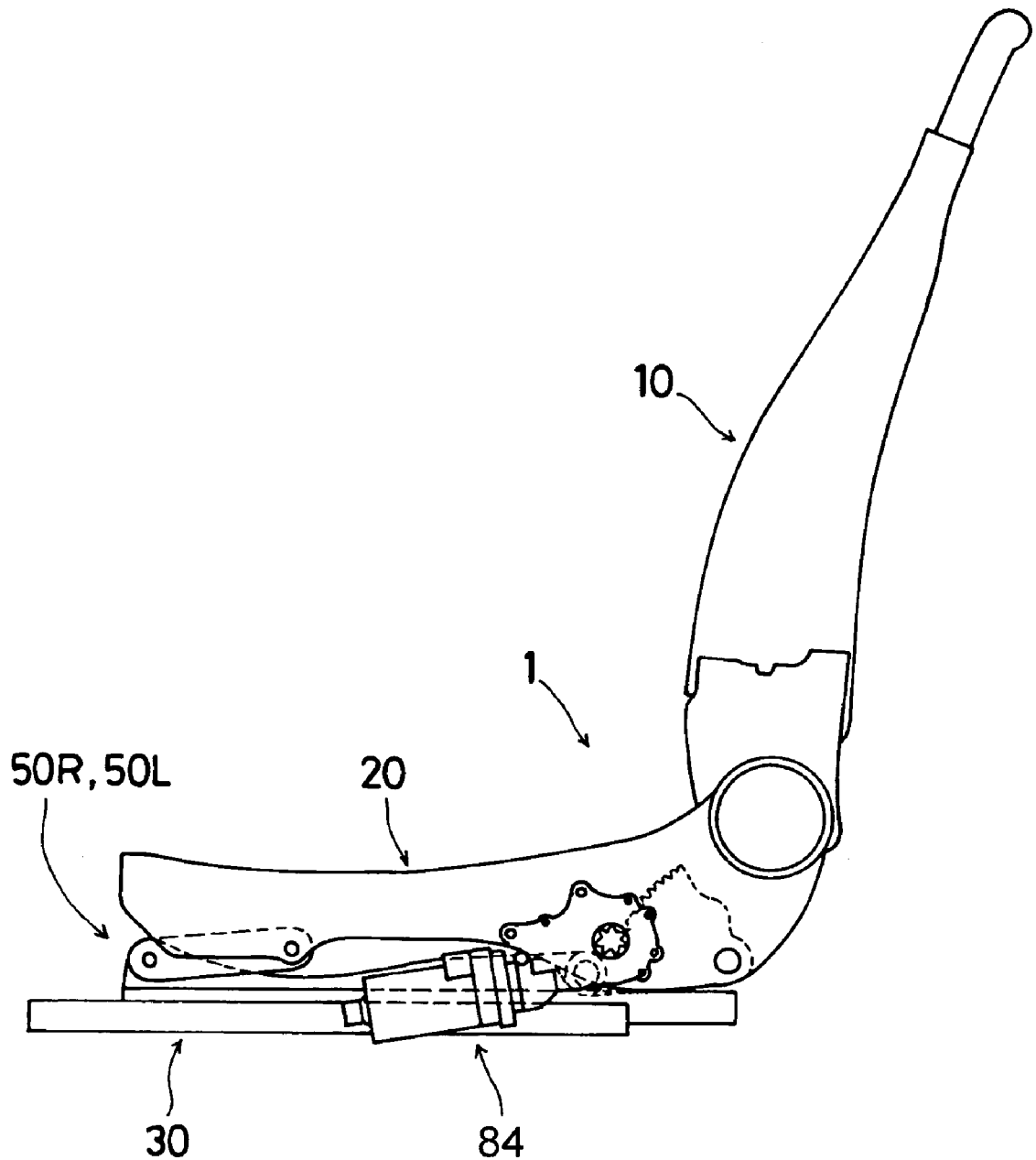
FIG. 3 shows a lateral view of the seat device for vehicle at the normal state according to the embodiment of the present invention.

In case the vehicle drives straight, the actuators 84, 85 are not operated by the controller 80 because the steering angle is not inputted, the position of the seat 1 is maintained without the inclination, as shown in FIGS. 2-3.

Figure 4:
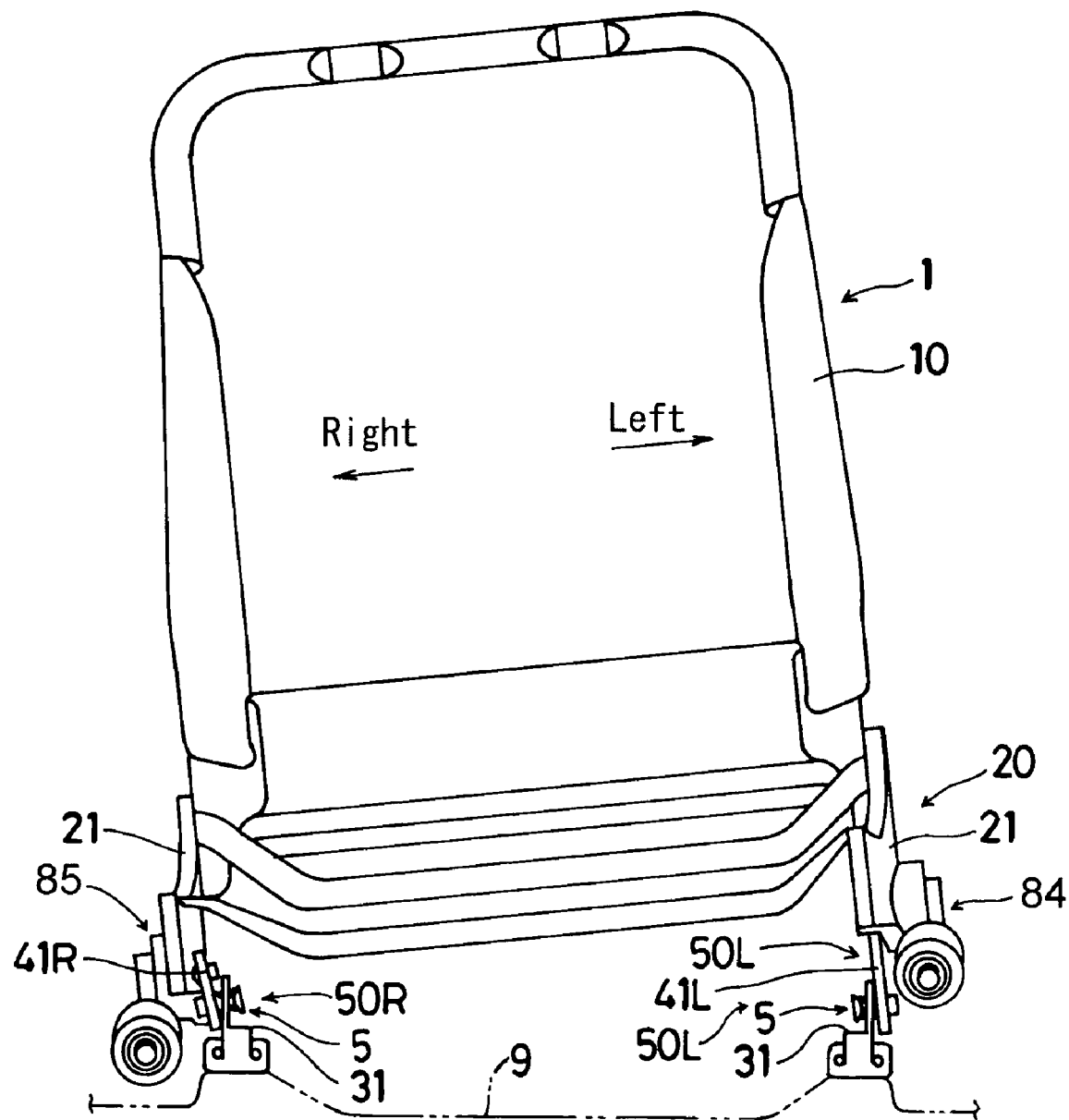
FIG. 4 shows a front view of the seat device for vehicle at rolling operation state according to the embodiment of the present invention.
Figure 5:
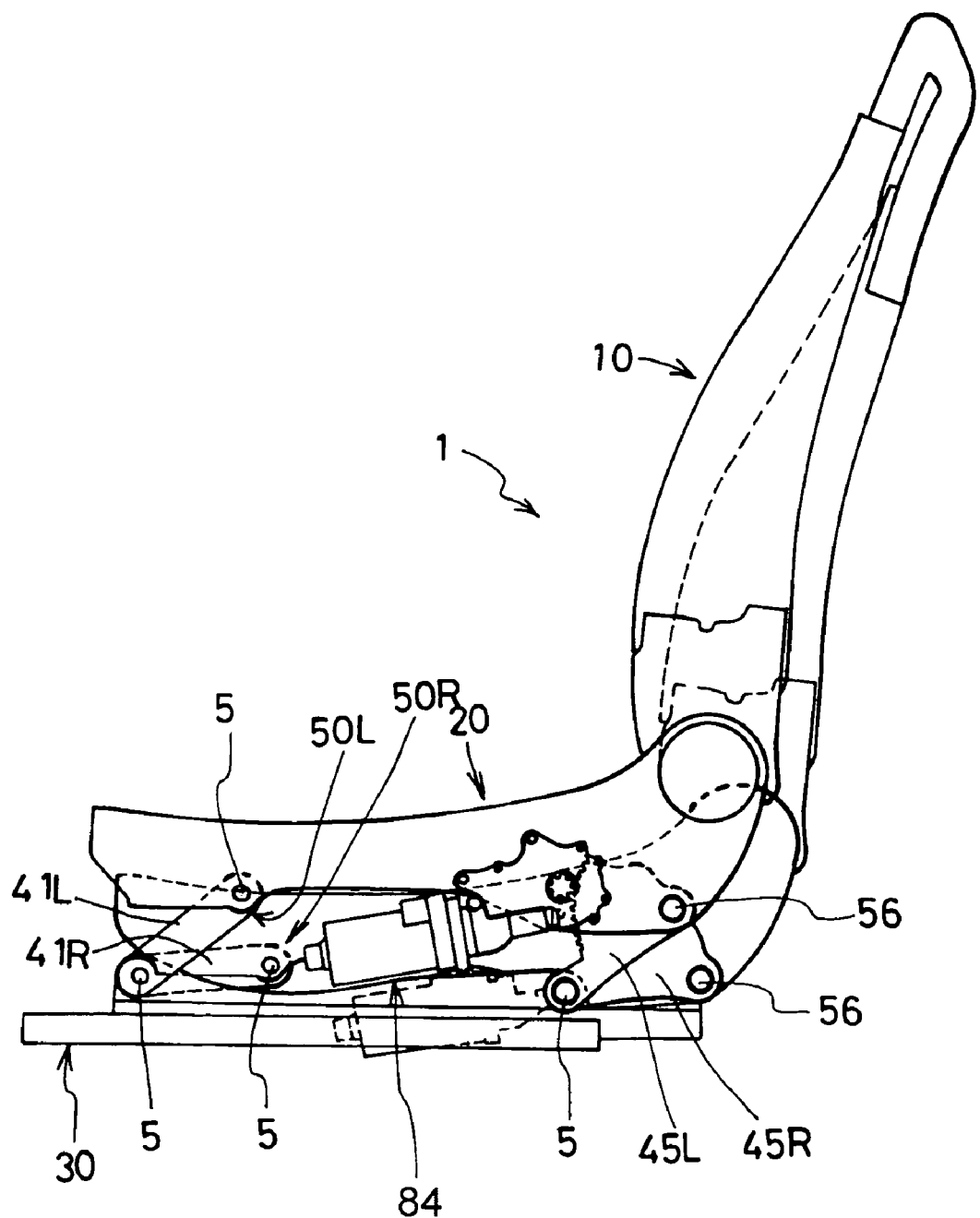
FIG. 5 shows a lateral view of the seat device for vehicle at the rolling operation state according to the embodiment of the present invention.

In case the vehicle turns, for example, to the right, the lateral acceleration generated at the vehicle is calculated based on the steering angle and the vehicle speed. In accordance with the lateral acceleration, the actuator 84, 85 is operated to elevate the left side link mechanism SOL. In this case, the right side link mechanism SOR may be declined in accordance with the elevation of the left side link mechanism SOL. Accordingly, as shown in FIGS. 4-5, the seat 1 is inclined (i.e., the rolling operation) in the right direction. The degree of the inclination of the seat 1 is predetermined in order to hold the occupant seating on the seat 1 without difficulty and is controlled to be the angle following a control map memorized in the controller 80.

As shown in FIGS. 4-5, upon the inclination of the seat 1, the front link 41R, 41L compresses the conical spring 55 of the rolling shaft mechanism 5 relative to the cushion side frame 21 and the upper rail 31 to tilt relative to the rotational shaft 52. The tilt is absorbed by the compression of the conical spring 55. With the construction of the link gears 45R, 45L, the arm portion 45b is tilted relative to the upper rail 31 by the rolling shaft mechanism 5. The arm portion 45b is not allowed to tilt relative to the cushion side frame 21 because the arm portion 45b and the cushion side frame 21 are connected via the rotational shaft 56. The inclining operation of the seat 1 is allowed by slight elastic deformation of the upper rail 31, the cushion side frame 21, and each component.

As shown in FIGS. 1-3, upon the operation of the seat height adjusting operation switch 89 by the occupant at the state that the rolling of the seat 1 is not operated, the actuator 84, 85, operates the left side link mechanism 50L and the right side link mechanism 50R simultaneously in the same direction. The occupant can adjust the height of the seat 1 to the optimum position by the foregoing operation. The adjusting operation can be performed when the vehicle is not traveling.

Figure 9:
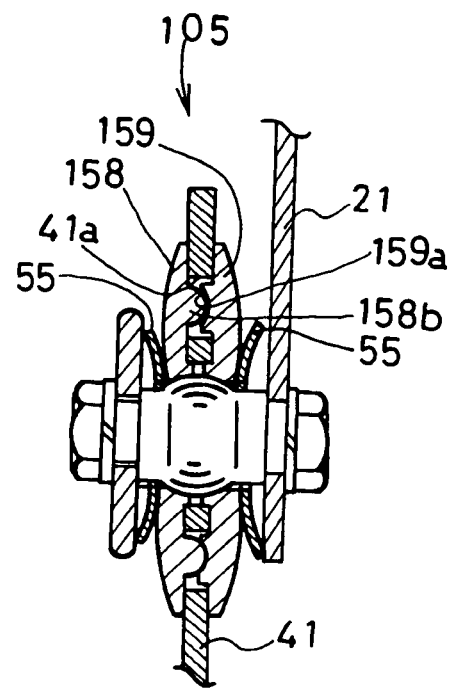
FIG. 9 is a cross-sectional view showing a rolling shaft mechanism according to a second embodiment of the present invention.

A rolling shaft mechanism 105 applied to the rolling seat device 2 according to a second embodiment of the present invention will be explained with reference to FIG. 9.

The rolling shaft mechanism 105 includes plates 158, 159 engaged with the front link 41. In other words, plural numbers of convex portions 158b are formed on one of the plates 158, 159. The convex portions 158b are configured to be fitted in a hole 41 provided on the front link 41. Plural concave portions 159a for receiving the convex portions 158b respectively are formed on the other of the plates 158, 159. The concave portion 159a and the convex portion 159b are assembled by welding at the contact portion. Accordingly, the plate 158, 159 can be assembled hard and easily by the weld without damaging the sliding surface between the plate 158, 159 and the conical spring 55.

Figure 10:
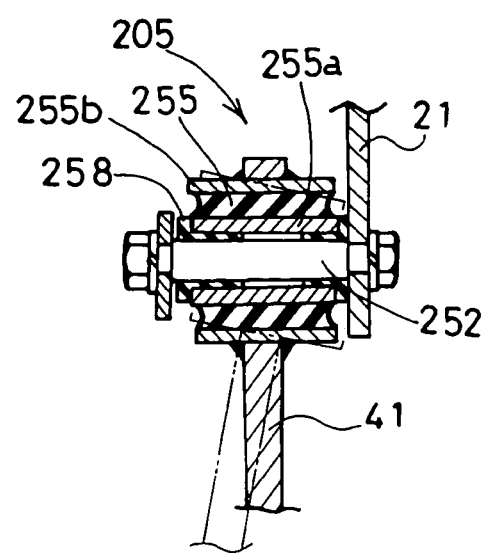
FIG. 10 is a cross-sectional view showing a rolling shaft mechanism according to a third embodiment of the present invention.

A rolling shaft mechanism 205 applied to the rolling seat device 2 according to a third embodiment of the present invention is shown in FIG. 10. With the construction of the rolling shaft mechanism 205, a rubber bush 255 is used in place of the conical spring 55 of the rolling shaft mechanisms 5, 105. The rubber bushes are provided between a cylindrical inner collar 255a and an outer collar 255b. The front link 41 is fixed to the outer collar 255b. The cushion side frame 21 is fixed to a shaft 252 rotatable in the inner collar 255a via a bearing 258. With the construction of the rolling shaft mechanism 205, upon the tilt (i.e., shown with two-dotted line of FIG. 10) of the front link 42 relative to the cushion side frame 21, the rubber bush 255 receives the deformation to generate the large restoring force. As shown in FIG. 10, the front link 41 is rotated with least resistance relative to the shaft 252 at the state without the tilt of the front link 41.

With the construction of the embodiments of the present invention, the seat height is adjusted by moving the right side and the left side of the seat simultaneously keeping the identical level by controlling the first and the second actuators independently provided at the right side link mechanism and the left side link mechanism respectively. Further, by moving the right side and the left side of the seat with the different level, the inclination of the seat can be adjusted to achieve the height adjusting function and the rolling function with one device.

With the construction of the embodiments of the present invention, the lateral tilt generated at the right side link mechanism and the left side link mechanism due to the inclination of the seat is absorbed by the elastic member of the rolling shaft mechanism, and the excessive inclination of the seat and the swing in the lateral direction can be prevented by the larger reaction force of the elastic member simultaneous with the generation of the lateral tilt of the right side link mechanism and the left side link mechanism.

With the construction of the embodiments of the present invention, the seat moves upward and downward and inclines smoothly by the ball shape shaft portion and the ball shape hole configured to be slidable with the ball shape shaft portion, which makes the assembling easy.

With the construction of the embodiments of the present invention, the first and the second actuators maintain the position of the parallel link, and the seat is supported with the high rigidity and the strength.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle seat device comprising:
   a right side link mechanism and a left side link mechanism adapted to be provided between a vehicle floor and a seat for supporting the seat to move upward and downward relative to the vehicle floor;
   a first actuator operatively engaged with the right side link mechanism for operating the right side link mechanism;
   a second actuator operatively engaged with the left side link mechanism for operating the left side link mechanism;
   a controller for controlling the first actuator and the second actuator separately;
   a detection means for detecting vehicle traveling state; and
   an operation means operated by a user, wherein the controller controls the first actuator and the second actuator to drive in reverse directions from each other based on an input signal from the detection means and controls the first actuator and the second actuator to drive in the same direction from each other based on an input signal from the operation means.

2. A vehicle seat device comprising:
   a right side link mechanism and a left side link mechanism adapted to be provided between a vehicle floor and a seat for supporting the seat to move upward and downward relative to the vehicle floor;
   a first actuator operatively engaged with the right side link mechanism for operating the right side link mechanism;
   a second actuator operatively engaged with the left side link mechanism for operating the left side link mechanism;
   a controller for controlling the first actuator and the second actuator separately;
   the right side link mechanism forming a parallel link with a seat side frame member, a floor side frame member, a front link member for connecting the seat side frame member and the floor side frame member, and a rear link member for connecting the seat side frame member and the floor side frame member; and
   the first actuator is linked to either one of the front link member and the rear link member.

3. The vehicle seat device according to claim 2, further comprising:
   a rolling shaft mechanism provided at a predetermined connection portion between the seat side frame member and the front link member, the front link member and the floor side frame member, the rear link member and the floor side frame member, respectively for absorbing torsion between the members.

4. The vehicle seat device according to claim 3, wherein the rolling shaft mechanism comprises:
a rotational shaft formed with a ball shape shaft portion;
a pair of plates including a ball shape hole sliding with the ball shape shaft portion, said pair of plates being configured to support the ball shape shaft portion; and
an elastic member for biasing the plates.

5. The vehicle seat device according to claim 2, wherein the rear link member of the right side link mechanism comprises:
a partial gear rotatably supported by the seat side frame member to be geared with an output gear of the first actuator; and
an arm portion connected to the floor side frame member.

6. A vehicle seat device comprising:
a right side link mechanism and a left side link mechanism adapted to be provided between a vehicle floor and a seat for supporting the seat to move upward and downward relative to the vehicle floor;
a first actuator operatively engaged with the right side link mechanism for operating the right side link mechanism;
a second actuator operatively engaged with the left side link mechanism for operating the left side link mechanism;
a controller for controlling the first actuator and the second actuator separately;
the left side link mechanism forming a parallel link with a seat side frame member, a floor side frame member, a front link member for connecting the seat side frame member and the floor side frame member, and a rear link member for connecting the seat side frame member and the floor side frame member; and
the second actuator is linked to either one of the front link member or the rear link member.

7. The vehicle seat device according to claim 6, further comprising:
a rolling shaft mechanism provided at a predetermined connection portion between the seat side frame member and the front link member, the front link member and the floor side frame member, the rear link member and the floor side frame member, respectively for absorbing torsion between the members.

8. The vehicle seat device according to claim 7, wherein the rolling shaft mechanism comprises:
a rotational shaft formed with a ball shape shaft portion;
a pair of plates including a ball shape hole sliding with the ball shape shaft portion, said pair of plates being configured to support the ball shape shaft portion; and
an elastic member for biasing the plates.

9. The vehicle seat device according to claim 6, wherein the rear link member of the left side link mechanism comprises:
a partial gear rotatably supported by the seat side frame member to be geared with an output gear of the second actuator; and
an arm portion connected to the floor side frame member.

* * * * *